(12) United States Patent
Bershteyn et al.

(10) Patent No.: US 8,743,735 B1
(45) Date of Patent: Jun. 3, 2014

(54) EMULATION SYSTEM FOR VERIFYING A NETWORK DEVICE

(75) Inventors: Mikhail Bershteyn, Cupertino, CA (US); Stephen Frederick Seeley, Londonderry, NH (US)

(73) Assignee: Cadence Design Systems, Inc., San Jose, CA (US)

( * ) Notice: Subject to any disclaimer, the term of this patent is extended or adjusted under 35 U.S.C. 154(b) by 182 days.

(21) Appl. No.: 13/353,122

(22) Filed: Jan. 18, 2012

(51) Int. Cl.
*H04L 12/28* (2006.01)

(52) U.S. Cl.
USPC .......................................................... 370/254

(58) Field of Classification Search
USPC ........... 370/241, 250, 252, 254; 709/221, 227
See application file for complete search history.

(56) References Cited

U.S. PATENT DOCUMENTS

| | | |
|---|---|---|
| 4,306,286 A | 12/1981 | Cocke et al. |
| 4,459,694 A | 7/1984 | Ueno et al. |
| 4,695,740 A | 9/1987 | Carter |
| 4,695,999 A | 9/1987 | Lebizay |
| 4,697,241 A | 9/1987 | Lavi |
| 4,706,216 A | 11/1987 | Carter |
| 4,758,745 A | 7/1988 | Elgamal et al. |
| 4,829,202 A | 5/1989 | Austin |
| 4,845,633 A | 7/1989 | Furtek |
| 4,849,928 A | 7/1989 | Hauck |
| 4,870,302 A | 9/1989 | Freeman |
| 4,901,259 A | 2/1990 | Watkins |
| 4,914,612 A | 4/1990 | Beece et al. |
| 4,935,734 A | 6/1990 | Austin |
| 5,036,473 A | 7/1991 | Butts et al. |
| 5,109,353 A | 4/1992 | Sample et al. |
| 5,114,353 A | 5/1992 | Sample |
| 5,231,588 A | 7/1993 | Agrawal et al. |
| 5,233,539 A | 8/1993 | Agrawal et al. |
| 5,329,470 A | 7/1994 | Sample et al. |
| 5,352,123 A | 10/1994 | Sample et al. |
| 5,448,496 A | 9/1995 | Butts et al. |
| 5,448,522 A | 9/1995 | Huang |
| 5,452,231 A | 9/1995 | Butts et al. |
| 5,452,239 A | 9/1995 | Dai et al. |
| 5,475,830 A | 12/1995 | Chen et al. |
| 5,477,475 A | 12/1995 | Sample et al. |
| 5,530,958 A | 6/1996 | Agarwal et al. |
| 5,544,069 A | 8/1996 | Mohsen |
| 5,551,013 A | 8/1996 | Beausoleil et al. |
| 5,563,829 A | 10/1996 | Huang |
| 5,572,710 A | 11/1996 | Asano et al. |
| 5,574,388 A | 11/1996 | Barbier et al. |
| 5,596,742 A | 1/1997 | Agarwal et al. |
| 5,612,891 A | 3/1997 | Butts et al. |
| 5,649,176 A | 7/1997 | Selvidge et al. |
| 5,659,716 A | 8/1997 | Selvidge et al. |
| 5,870,410 A | 2/1999 | Norman et al. |
| 5,960,191 A | 9/1999 | Sample et al. |
| 6,002,861 A | 12/1999 | Butts et al. |

(Continued)

*Primary Examiner* — Chi Pham
*Assistant Examiner* — Robert Lopata
(74) *Attorney, Agent, or Firm* — Dickstein Shapiro LLP (57) ABSTRACT

Various embodiments of the present invention are generally directed to a method and system for functionally verifying a network device design programmed into a hardware logic verification system. The method and system encapsulates and de-encapsulates test patterns generated by a tester application into and out of network packets, which are further encapsulated into and de-encapsulated from enclosing data packets for fast and efficient delivery to the network device. Such method and system decreases functional verification times for a network device DUT while requiring little to no modification of existing tester applications and functional verification hardware.

24 Claims, 9 Drawing Sheets

(56) References Cited

U.S. PATENT DOCUMENTS

| | | | |
|---|---|---|---|
| 6,020,760 A | 2/2000 | Sample et al. | |
| 6,035,117 A | 3/2000 | Beausoleil et al. | |
| 6,051,030 A | 4/2000 | Beausoleil et al. | |
| 6,058,492 A | 5/2000 | Sample et al. | |
| 6,285,211 B1 | 9/2001 | Sample et al. | |
| 6,289,494 B1 | 9/2001 | Sample et al. | |
| 6,377,911 B1 | 4/2002 | Sample et al. | |
| 6,377,912 B1 | 4/2002 | Sample et al. | |
| 6,618,698 B1 | 9/2003 | Beausoleil et al. | |
| 6,694,464 B1 | 2/2004 | Quayle et al. | |
| 6,842,729 B2 | 1/2005 | Sample et al. | |
| 6,850,880 B1 | 2/2005 | Beausoleil et al. | |
| 6,901,359 B1 | 5/2005 | Beausoleil et al. | |
| 6,973,043 B1 * | 12/2005 | Farooq | 370/250 |
| 7,043,417 B1 | 5/2006 | Beausoleil et al. | |
| 7,047,179 B2 | 5/2006 | Beausoleil et al. | |
| 7,050,962 B2 | 5/2006 | Zeidman | |
| 7,072,825 B2 * | 7/2006 | Wang et al. | 703/28 |
| 7,107,203 B1 | 9/2006 | Beausoleil et al. | |
| 7,194,535 B2 * | 3/2007 | Hannel et al. | 709/224 |
| 7,210,116 B2 | 4/2007 | Zeidman et al. | |
| 7,266,490 B2 | 9/2007 | Zeidman | |
| 7,349,346 B2 * | 3/2008 | Castelino | 370/252 |
| 7,440,866 B2 | 10/2008 | Maher et al. | |
| 7,555,423 B2 | 6/2009 | Beausoleil et al. | |
| 7,606,698 B1 | 10/2009 | Elmufdi et al. | |
| 7,647,583 B2 | 1/2010 | Zeidman et al. | |
| 7,721,036 B2 | 5/2010 | Poplack et al. | |
| 7,725,304 B1 | 5/2010 | Beausoleil et al. | |
| 7,738,398 B2 | 6/2010 | Quayle et al. | |
| 7,738,399 B2 | 6/2010 | Quayle et al. | |
| 7,739,094 B1 | 6/2010 | Poplack et al. | |
| 7,739,097 B2 | 6/2010 | Sample et al. | |
| 7,792,933 B2 | 9/2010 | Butts et al. | |
| 7,826,381 B1 * | 11/2010 | Kastuar et al. | 370/242 |
| 7,827,023 B2 | 11/2010 | Beausoleil et al. | |
| 7,835,897 B2 | 11/2010 | Zeidman | |
| 7,904,288 B1 | 3/2011 | Beausoleil et al. | |
| 7,908,465 B1 | 3/2011 | Poplack et al. | |
| 8,005,958 B2 * | 8/2011 | Hannel et al. | 709/227 |
| 8,027,828 B2 | 9/2011 | Bershteyn et al. | |
| 8,090,568 B2 | 1/2012 | Beausoleil et al. | |
| 8,174,991 B1 * | 5/2012 | Trivedi | 370/241 |
| 8,305,910 B2 * | 11/2012 | Connolly | 370/250 |
| 2002/0015387 A1 * | 2/2002 | Houh | 370/250 |
| 2002/0173927 A1 * | 11/2002 | Vandiver | 702/122 |
| 2003/0172177 A1 * | 9/2003 | Kersley et al. | 709/236 |
| 2004/0095890 A1 * | 5/2004 | Wang et al. | 370/250 |
| 2005/0015642 A1 * | 1/2005 | Hannel et al. | 714/4 |
| 2006/0229020 A1 * | 10/2006 | Mlinarsky et al. | 455/67.14 |
| 2009/0204692 A1 * | 8/2009 | Smith et al. | 709/221 |
| 2010/0061378 A1 * | 3/2010 | Joyner et al. | 370/395.53 |

* cited by examiner

EMULATION SYSTEM FOR VERIFYING A NETWORK DEVICE

FIELD

The present patent document relates generally to the functional verification of networking devices. In particular, the present patent document relates to a method and system for delivering test patterns, including network packets, between a network tester application and a networking device design under test in a processor-based simulation acceleration/emulation system.

BACKGROUND

Networking devices are frequently tested using a network tester application that creates test patterns to flood a network device with packets. A typical test setup includes a tester application running on a workstation that has network ports connected to the network device. A typical packet contains digital data organized with a pre-determined pattern, and includes header information as well as a payload. The tester application manages the outgoing and incoming test patterns, commonly including Ethernet frames or internet protocol (IP) datagrams, monitoring the performance of the network device under various test conditions. The tester application can then create reports and statistics for the network device, enabling manufacturers to understand and improve upon the performance of the network device. Exemplary tester applications are commercially available from Spirent Corporation and IXIA Corporation.

Prior to manufacture, hardware designers frequently employ simulators and/or emulators to verify the functional behavior of the electronic devices and systems fabricated in accordance with their designs. One type of verification system for a hardware device under test (DUT) is a processor-based simulation acceleration/emulation system (hereafter "emulator") in communication with one or more workstations that send stimuli to and from a DUT. Such stimuli can include digital test vectors or real signals from a logic system in which the DUT is intended for installation (sometimes referred to as a "target system"). For the specific case of a network DUT, a network tester application running on the workstation transmits test patterns (i.e., a collection of digital signals) to the emulator and also receives test patterns back from the network DUT residing on the emulator. The test patterns sent to the emulator for the network DUT of course depend on the nature of the network DUT. A network DUT that will operate as an IP router once manufactured will need to receive IP datagrams, as that is the protocol that it would encounter in real-world use. In the case of multiple tester applications sending and receiving test patterns and test patterns to and from the network DUT, multiple ingress and egress channels to the emulator are required. These channels may connect the emulator with a single workstation or multiple workstations at the choosing of the user of the system. In general, the delay caused by sending stimuli over the communication channels between a workstation and an emulator are substantial, resulting in relatively long functional verification times.

One way to increase the speed of the communication channel between a workstation and an emulator is through the use of a speedbridge. A speedbridge is a hardware devices that connects an emulated DUT to a workstation running a network tester application, where the workstation outputs stimuli in the format of a standard network communications protocol, for example transmission control protocol (TCP), IP, or Ethernet. A speedbridge is capable of buffering data received on its network side and reproducing the same data on its emulator side. A speedbridge can map the network communications protocol into a protocol recognized by the DUT of the emulator, for example the commonly-used media independent interface (MII), including 10 gigabit MII (XGMII). Use of a speedbridge presents several downsides, most notably that a speedbridge represents additional hardware, adding to the cost and complexity of the functional verification process. If a single speedbridge supports a single channel, a thirty-two-channel network DUT requires the use of thirty-two speedbridges. These additional hardware components are costly and take up additional physical space. The introduction of further hardware components also decreases the overall reliability of the system by introducing additional sources of potential failure. Furthermore, the ability to verify a network DUT using a particular network protocol is limited to the available speedbridges that support that protocol. For example, a speedbridge supporting Ethernet may be available, but any number of other networking protocols may have no speedbridge available.

An alternative method to increase the speed of functional verification in a system is to employ acceleration techniques, including a technique known as transaction-based acceleration (TBA). In general, TBA operates by partitioning testbench functionality between a workstation and an emulator, and minimizing the volume of information transferred between the two across their connecting communication channel. When properly implemented, TBA may substantially decrease functional verification time by a substantial reduction of delay across the communication channel.

Figure 9:
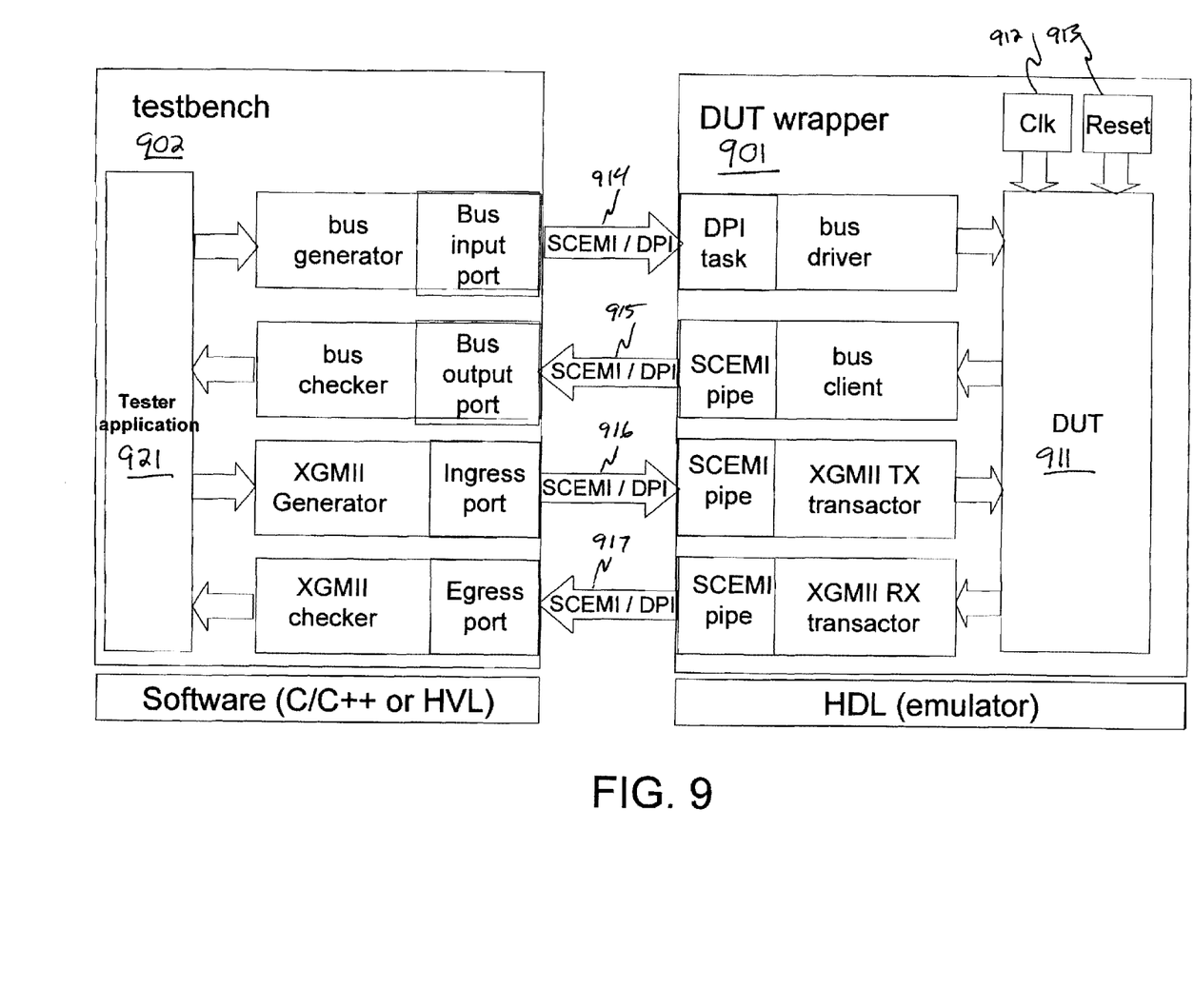
FIG. 9 is an illustration of a transaction-based acceleration interface between a testbench and the wrapper of a device under test.

FIG. 9 depicts further detail of the components of an embodiment of a TBA interface between a testbench and the wrapper of a DUT in an emulator. A "wrapper" is software that acts as an adapter between two objects that are otherwise incapable of communication. Here, the DUT wrapper 901 is on the "hardware side" of the communications interface and the testbench is on the "software side." The DUT wrapper 901 for the DUT 911, written in hardware description language (HDL), acts as an interface between the DUT 911 and the software of the testbench 902, which is written in another language, generally C/C++ or a hardware verification language (HVL). The wrapper includes interfaces for a clock 912, reset 913, and various communication channels 914 to 917.

Network tester applications used to test network devices are available from various suppliers, and it is desirable to use these tester applications during functional verification of a design under test in an emulator. These tester applications, in addition to supplying the network device with test patterns, monitor protocol compliance by the network DUT, characterize its performance in response to testing stimuli, provide a graphical user interface for the user of the functional verification system, and generate reports based on the results of the network tests. As such, tester applications are used for functional verification of an emulated network DUT. However, the use of acceleration techniques frequently requires that a tester application for a network DUT be modified, rewritten, or written entirely from scratch, increasing the time and cost of functional verification of a network DUT.

SUMMARY

A method and system for delivering test patterns, including network packets, between a network tester application and a networking device design under test in a processor-based simulation acceleration/emulation system is disclosed.

A first aspect of the method comprises programming the network device design into a hardware logic verification system comprised of a plurality of emulation resources, establishing a network tunnel between a client endpoint and a server application of the hardware logic verification system, wherein the network tunnel feeds a plurality of first data packets to a socket of the server application of the hardware logic verification system, de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet, and receiving the test patterns at the programmed network device.

In another aspect of the method, the tester application runs on a tester host and the programmed network device resides on a host different from the tester host.

In another aspect of the method, the first data packet comprises a transaction of a transaction based acceleration methodology.

In another aspect of the method, the second data packet comprises an internet protocol datagram.

In another aspect of the method, the second data packet comprises an Ethernet frame.

In another aspect of the method, the steps of the method are performed in a particular order, first, programming the network device design into a hardware logic verification system comprised of a plurality of emulation resources, second, establishing a network tunnel between a client endpoint and a server application of the hardware logic verification system, wherein the network tunnel feeds a plurality of first data packets to a socket of the server application of the hardware logic verification system, third, de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet, and, fourth, receiving the test patterns at the programmed network device.

Another aspect of the system comprises a hardware logic verification system comprised of a plurality of emulation resources and configured for performing a process, comprising: programming network device design into the hardware logic verification system, establishing a network tunnel between a client endpoint and a server application of the hardware logic verification system, wherein the network tunnel feeds a plurality of first data packets to a socket of the server application of the hardware logic verification system, de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet, and receiving the test patterns at the programmed network device.

In another aspect of the system, the second data packet comprises a transaction of a transaction based acceleration methodology.

In another aspect of the system, the second data packet comprises a transaction of a transaction based acceleration methodology.

In another aspect of the system, the first data packet comprises an internet protocol datagram.

In another aspect of the system, the first data packet comprises an Ethernet frame.

In another aspect of the system, the hardware logic verification system comprised of a plurality of emulation resources is configured to perform the process steps in a particular order, first, programming network device design into the hardware logic verification system, second, establishing a network tunnel between a client endpoint and a server application of the hardware logic verification system, wherein the network tunnel feeds a plurality of first data packets to a socket of the server application of the hardware logic verification system, third, de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet, and, fourth, receiving the test patterns at the programmed network device.

Another aspect comprises a computer-readable non-transitory storage medium having stored thereon a plurality of instructions, the plurality of instructions when executed by a computer, cause the computer to perform: programming a network device design into a hardware logic verification system comprised of a plurality of emulation resources, establishing a network tunnel between a client endpoint and a server application of the hardware logic verification system, wherein the network tunnel feeds a plurality of first data packets to a socket of the server application of the hardware logic verification system, de-encapsulating a second data packet generated by the tester application from within a first data packet of the plurality of first data packets, wherein the second data packet comprises test patterns generated by the network tester application and one or more second headers, and wherein the first data packet includes one or more first headers in addition to the second data packet, and receiving the test patterns at the programmed network device.

In another aspect the tester application runs on a tester host and the programmed network device resides on a host different from the tester host.

In another aspect, the first data packet comprises a transaction of a transaction based acceleration methodology.

In another aspect, the first data packet comprises an internet protocol datagram.

In another aspect, the first data packet comprises an Ethernet frame.

In another aspect, the plurality of instructions stored on the computer-readable non-transitory storage medium are configured to perform the process steps in a particular order, first, programming a network device design into a hardware logic verification system comprised of a plurality of emulation resources, second, establishing a network tunnel between a client endpoint and a server application of the hardware logic verification system, wherein the network tunnel feeds a plurality of first data packets to a socket of the server application of the hardware logic verification system, third, de-encapsulating a second data packet generated by the tester application from within a first data packet of the plurality of first data packets, wherein the second data packet comprises test patterns generated by the network tester application and one or more second headers, and wherein the first data packet includes one or more first headers in addition to the second data packet, and fourth receiving the test patterns at the programmed network device.

Another aspect comprises a computer-readable non-transitory storage medium having stored thereon a plurality of instructions, the plurality of instructions when executed by a computer, cause the computer to perform establishing a network tunnel between a client endpoint and a network device design programmed into a hardware logic verification system, wherein the hardware logic verification system is comprised of a plurality of emulation resources generating a test pattern for a network device design by a tester application, wherein the tester application runs on a host having computing resources including at least a processor encapsulating the test pattern within a first data packet, wherein the first data packet includes one or more first headers in addition to the test pattern, encapsulating the first data packet within a second data packet, wherein the second data packet includes one or more second headers in addition to the first data packet, and transmitting the second data packet from the client endpoint to the network device design.

In another aspect, the tester application runs on a tester host and the programmed network device resides on a host different from the tester host.

In another aspect, the second data packet comprises a transaction of a transaction based acceleration methodology.

In another aspect, the first data packet comprises an internet protocol datagram.

In another aspect, the first data packet comprises an Ethernet frame.

In another aspect, the plurality of instructions stored on the computer-readable non-transitory storage medium are configured to perform the process steps in a particular order, first, establishing a network tunnel between a client endpoint and a network device design programmed into a hardware logic verification system, wherein the hardware logic verification system is comprised of a plurality of emulation resources, second, generating a test pattern for a network device design by a tester application, wherein the tester application runs on a host having computing resources including at least a processor, third, encapsulating the test pattern within a first data packet, wherein the first data packet includes one or more first headers in addition to the test pattern, fourth, encapsulating the first data packet within a second data packet, wherein the second data packet includes one or more second headers in addition to the first data packet, and fifth, transmitting the second data packet from the client endpoint to the network device design.

The above and other preferred features described herein, including various novel details of implementation and combination of elements, will now be more particularly described with reference to the accompanying drawings and pointed out in the claims. It will be understood that the particular methods and systems are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles of the present invention.

The figures are not necessarily drawn to scale and are only intended to facilitate the description of the various embodiments described herein; the figures do not describe every aspect of the teachings disclosed herein and do not limit the scope of the claims.

DETAILED DESCRIPTION

A method and system for communicating between a network tester application and a networking device design under test in a processor-based simulation acceleration/emulation system is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 1:
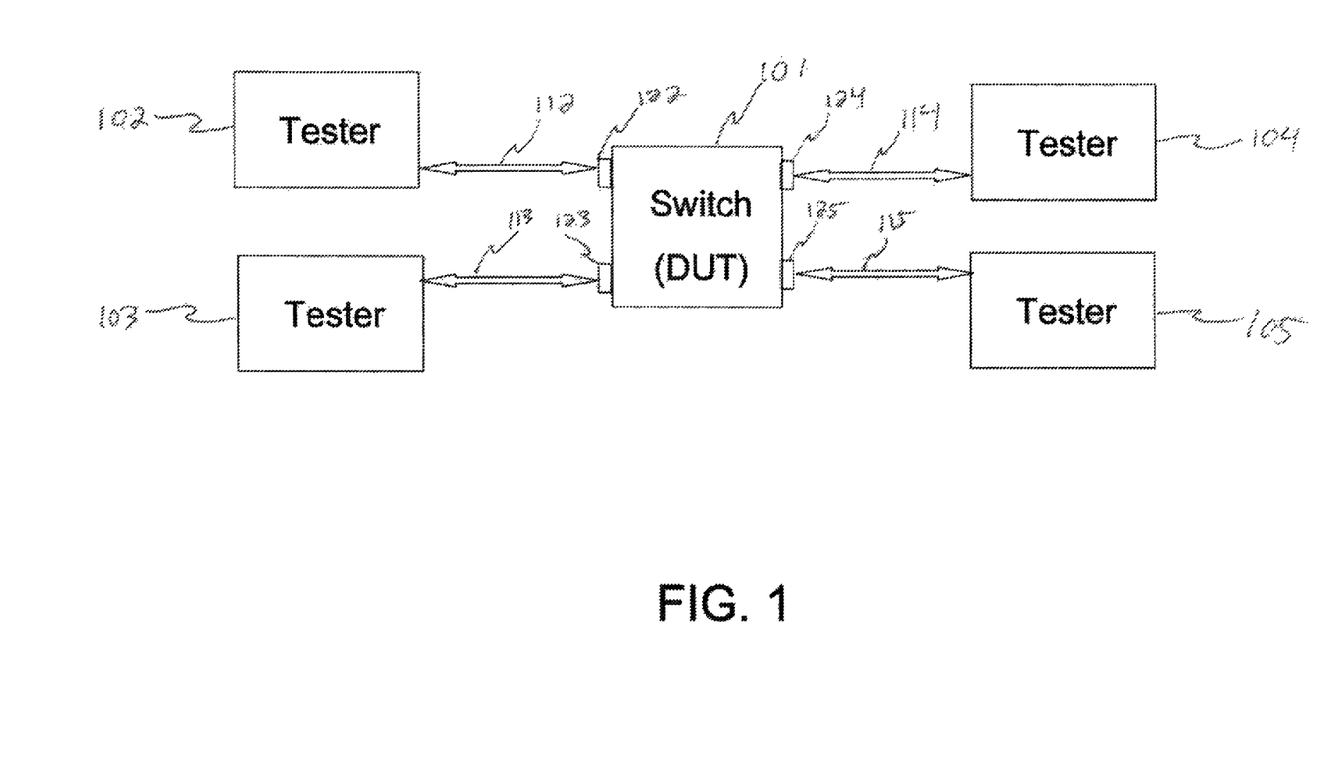
FIG. 1 is an illustration of a generic test configuration for a network device under test.

Referring to FIG. 1, switch 101 is an example of any of a number of network equipment hardware components, including switches, routers, network interface cards, and the like, capable of transmitting or receiving data packets in a computer network through ports designed for that purpose. Such data packets may conform to any number of networking protocols, including Ethernet, IP, and Fibrechannel. In FIG. 1, switch 101 has four ports 122-125. In the case where port 122 is an ingress port, switch 101 is capable of receiving data packets at port 122 from tester host 102 via communication channel 112. In the case where port 122 is an egress port, switch 101 is capable of transmitting data packets from port 122 to tester host 102 via communication channel 112. Port 122 may be an ingress port, an egress port, or both. Each of ports 123, 124, and 125 similarly communicate with tester hosts 103, 104, and 105 via communication channels 113, 114, and 115 respectively. Each of ports 123, 124, and 125 may also be an ingress port, an egress port, or both. Each of tester hosts 102-105 are comprised of hardware and software that generates/consumes tester data and data packets that are transmitted to/received from the DUT.

Figure 2:
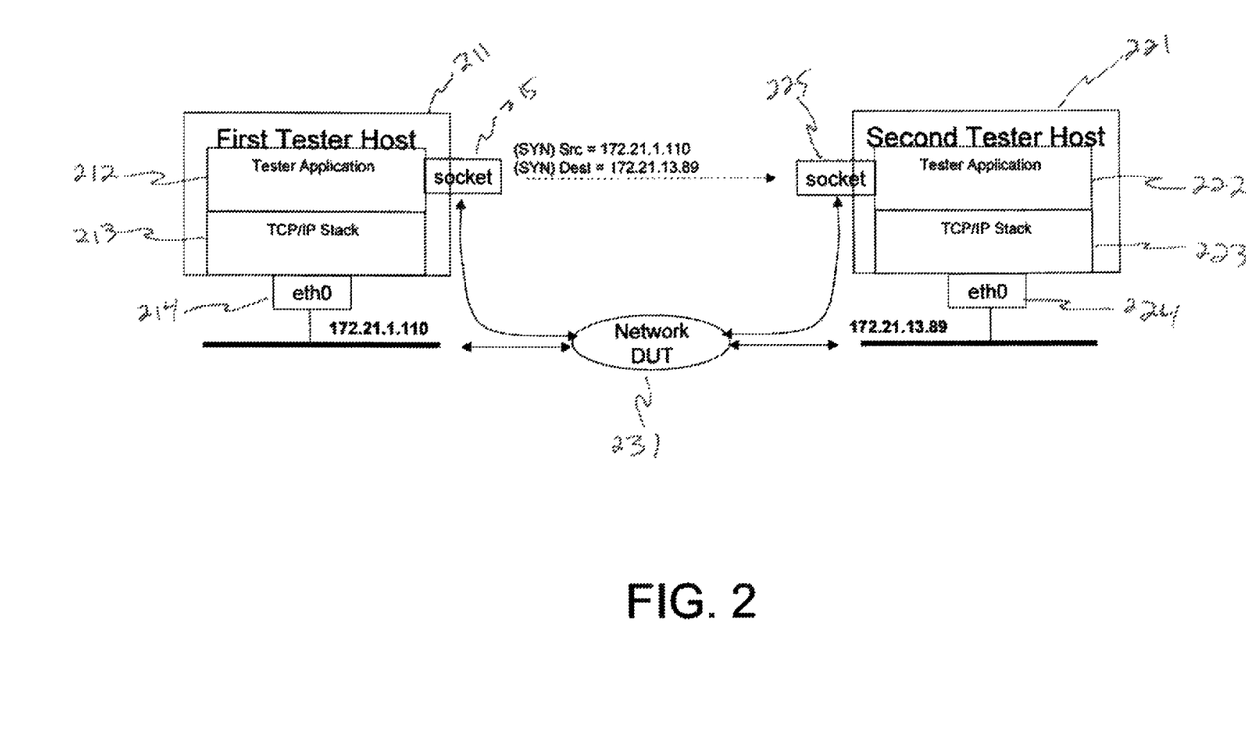
FIG. 2 is an illustration of the transmission and receipt of data packets through a network device having two ports.

Referring now to FIG. 2, there is illustrated the transmission and receipt of data packets through a conventional network device having two ports. As before, source tester application 212 of source tester host 211 generates test patterns to be transmitted to a network device that pass through the TCP/IP stack 213 to generate Ethernet frames encapsulating the test patterns. The tester applications 212 and 222 open up communication sockets 215 and 225 on their respective ends of the communication channel between them. The test patterns are addressed from source IP address 172.21.1.110 to the destination IP address of tester host 221 at 172.21.13.89. The Ethernet frames are transmitted from source Ethernet port 214. Network device 231 receives the data packets and routes them to destination Ethernet port 224 of tester host 221 using the destination IP address. The data packets pass through the TCP/IP stack 223 and are then received by the destination tester application 222.

For a network DUT having a greater number of ports than the two shown, more tester hosts may be used, each hosting a tester application, to test each of the ports of the network device. Tester hosts need not be embodied in separate workstations; a single workstation may have multiple ports to test multiple ports of a network device.

Figure 3:
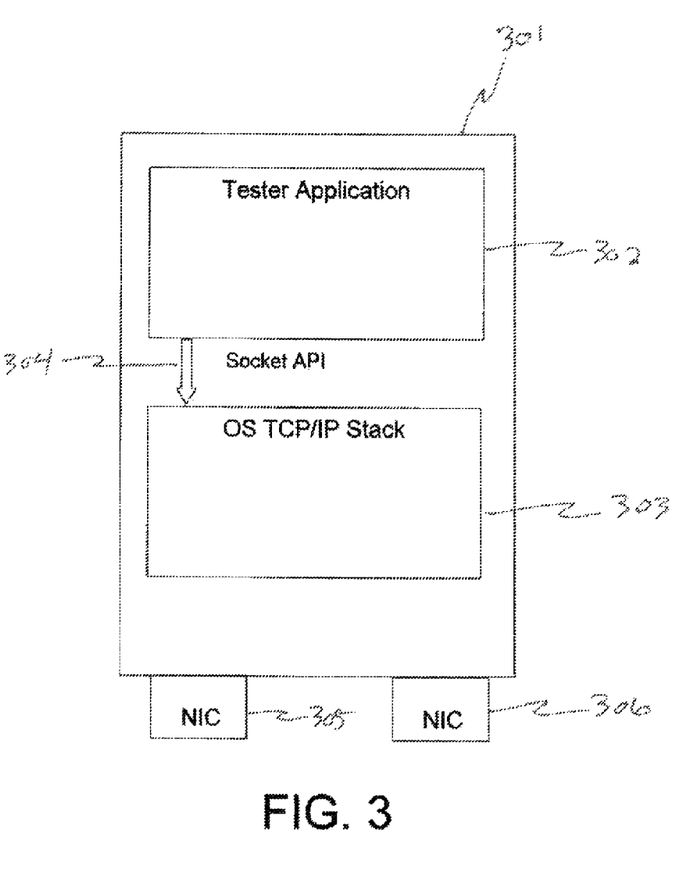
FIG. 3 is an illustration of the operation of a network tester.

FIG. 3 depicts one type of network tester in greater detail, where such tester host 301 is a general purpose workstation, including a general-purpose processor, random-access memory, storage, and network interface cards (NIC) 305 and 306. A tester application 302, written for such a workstation, is responsible for the graphical user interface (GUI), generating test patterns to be applied to the network device, managing the test process, ensuring protocol compliance, monitoring the network device's performance, maintaining performance statistics, and generating test reports. Tester application 302 communicates with the operating system's (OS) transmission control protocol/internet protocol (TCP/IP) stack 303 via the application programming interface (API) socket 304. The OS TCP/IP stack is responsible for managing the tester host's connections, encapsulating data, and binding IP addresses to test patterns to be transmitted from the tester host. Test patterns generated by the tester application are passed through the TCP/IP stack before transmission from the tester host via a NIC as data packets.

Figure 4:
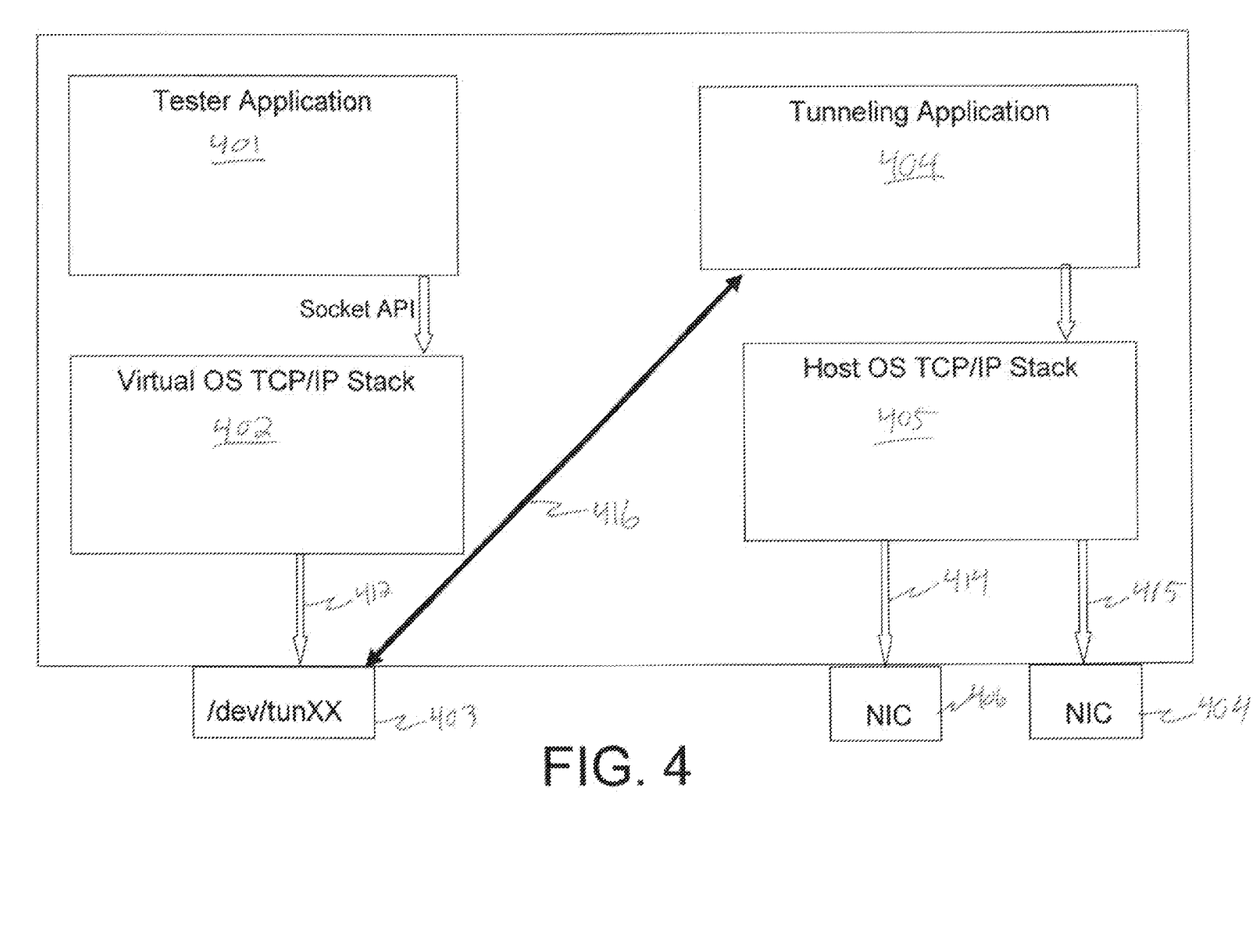
FIG. 4 is an illustration of the operation of tunneling technologies connecting software services.

FIG. 4 is a diagram depicting the operation of tunneling technologies, such as virtual private networks (VPN), connecting the software applications that they service to, for example, a tester application. For a network tester application transmitting over VPN, a tester application 401 generate data packets intended to be transmitted to a network DUT. However, instead of being sent through the tester host OS's TCP/IP stack, the tester application's API socket is connected to a virtual OS TCP/IP stack 402. Here, the virtual OS TCP/IP stack is responsible for managing the tester host's connections, encapsulating test patterns received from the tester application into IP datagrams, and binding IP addresses to those datagrams. The IP datagram is then transmitted by a network tunnel device 403, which is a virtual network kernel device interfacing with the OS TCP/IP stack, to a tunneling software application 404. The tunneling application 404 is responsible for creating a connection between the virtual and real networks, forwarding IP datagrams to and from real networks. The tunneling application forwards the IP datagram to the real host OS TCP/IP stack 405. As with the virtual OS TCP/IP stack, this stack is responsible for managing the tester host's network connections, encapsulating received IP datagrams, and binding IP addresses. After encapsulating the forwarded IP datagram, for example within a second IP datagram or an Ethernet frame, it is passed to an attached network interface card 406 or 407 for transmission to its destination over a real network.

Figure 5:
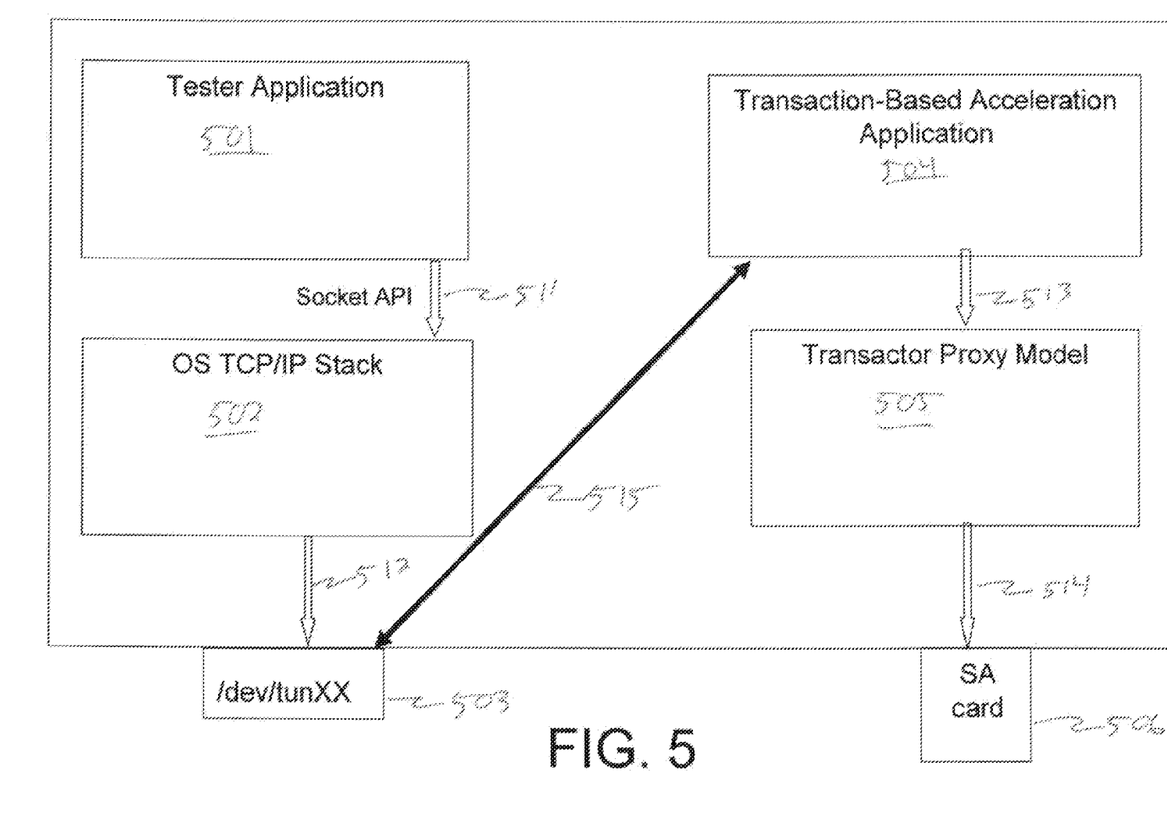
FIG. 5 is an illustration of a tester application connected to a transaction-based acceleration (TBA) application through a virtual network tunneling device.

FIG. 5 is a diagram depicting an embodiment wherein a transaction-based acceleration (TBA) application is connected to a tester application through a virtual network tunneling device. Tester application 501 generates test patterns bound for a DUT, consumes the data generated as a result of the test, manages testing, and keeps statistics and profiles of tests. The tester application 501 is connected via an API socket 511 to the OS TCP/IP stack 502 that encapsulates test patterns received from the tester application into IP datagrams. A network tunnel device 503 interfaces with the OS TCP/IP stack, connecting it with a socket connection to a TBA application 504. Network tunnel device 503 transmits the IP datagrams to the TBA application 504. TBA application 504 connects the network tunnel device 503 to a transactor proxy model 505 and forwards the received IP datagrams. The transactor proxy model manages the connection between the TBA application 504 and the simulation acceleration card 506, encapsulates the IP datagrams into transactions, and binds the IP address to transaction pipes connected to simulation acceleration (SA) card 506. The encapsulated IP datagrams are then transmitted from SA card 506 as transactions for receipt by the DUT.

In the embodiment depicted in FIG. 5, the tester application may also receive communications from the DUT. This receiving process is essentially the reverse of the transmission process just described, wherein the transactor proxy model 505 receives transactions from the DUT, which are de-encapsulated into IP datagrams that are forwarded to TBA application 504. The IP datagrams are then forwarded over the socket connection 515 to network tunnel 503 that inject them into OS TCP/IP stack 502. OS TCP/IP 502 stack then de-encapsulates the IP datagrams and forwards the test patterns for consumption by tester application 501.

Network tunnel device 503 of FIG. 5 is one type of virtual kernel network device. In another embodiment, network tunnel device 503 is replaced with a network tap device. In this alternative embodiment, OS TCP/IP stack 502 encapsulates test patterns received from the tester application 501 into Ethernet frames, rather than IP datagrams as with a network tunnel, that are transmitted from the network tap device over socket connection 515 to TBA application 504. Transactor proxy model 505 then encapsulates the Ethernet frames into transactions for transmission to the network DUT, the transactions containing the Ethernet frame. Likewise, transactions received at transactor proxy model 505 from SA card 506 encapsulate Ethernet frames that are de-encapsulated by the transactor proxy model 505 and forwarded to the network tap by TBA application 504. OS TCP/IP stack 502 then de-encapsulates the Ethernet frames and forwards the test patterns to be consumed by tester application 501.

Figure 6:
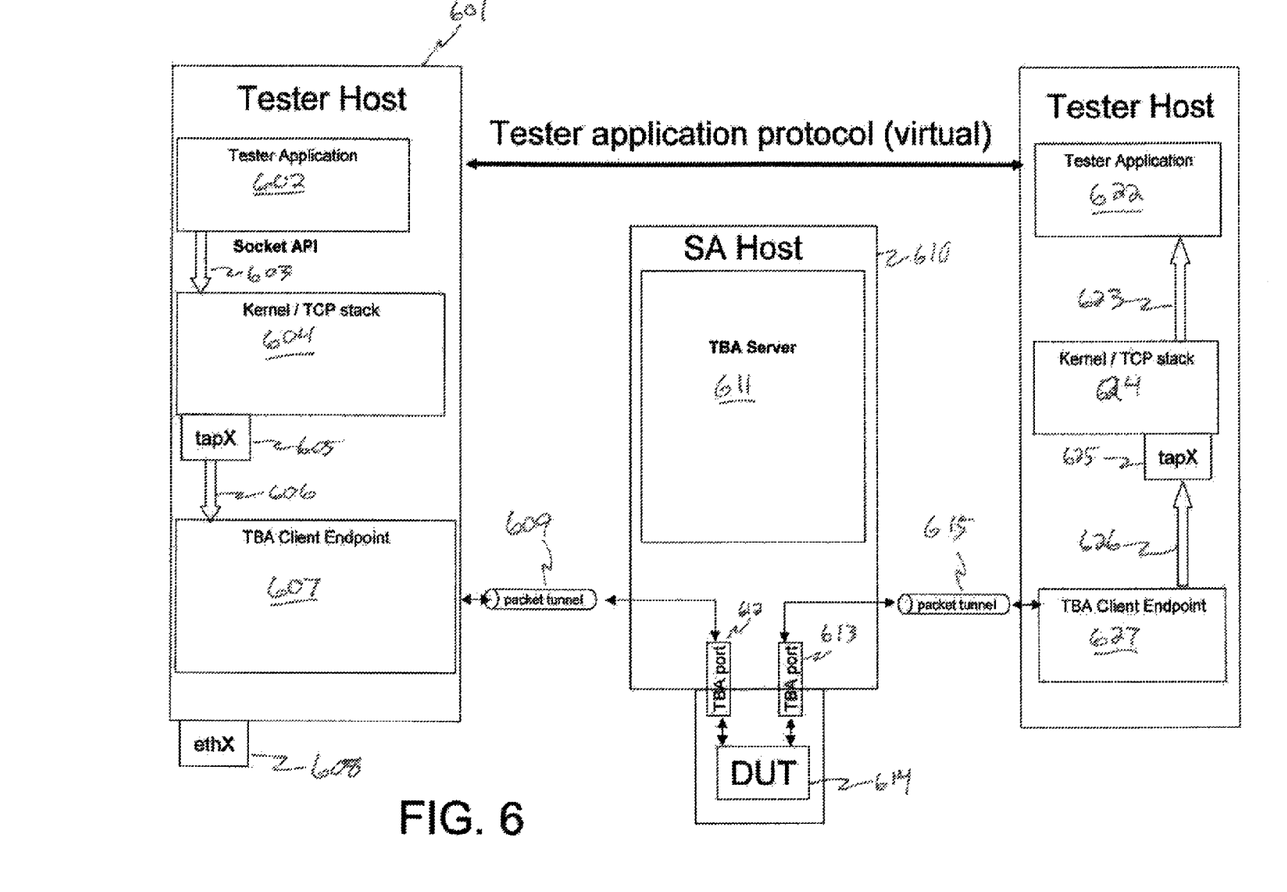
FIG. 6 is an illustration of a tester application residing on a first host connected to a TBA application residing on a second host with a virtual network tunneling device.

FIG. 6 depicts an embodiment where the tester application and the TBA application reside on separate network hosts. At a physical level, communication cabling connects tester host 601 and simulation acceleration (SA) host 610, but they are otherwise distinct. Tester application 602 of tester host 601 generates test patterns as before and uses standard IP addresses. Tester application 602 connects to kernel network address tables (NAT) and TCP/IP stack 604 via its API socket 603. The NAT converts the real destination IP address of the test patterns to a private destination IP address. The TCP/IP network stack encapsulates test patterns into Ethernet frames and forwards them to an attached virtual kernel network device, here a network tap 605. Network tap 605 connects to a TBA client endpoint 607 that establishes a socket-based tunnel 609 to TBA server 611 residing on the simulation acceleration host 610. TBA client endpoint 607 advertises its network ID and mask to the server, and routes outgoing transactions encapsulating Ethernet frames to the SA host 611 via tunnel 609.

SA host 610 receives the transactions from tunnel 609, routing them to a TBA port 612 of DUT 614. The operation of DUT 614 depends on its functionality, but here is a network switch, such that it receives Ethernet frames and routes them toward tester application 622. The Ethernet frames are transmitted from TBA port 613 and routed over tunnel 615 as transactions. SA host may be connected to multiple tester hosts, each of which has a socket-based tunnel to that tester host. After the transactions are received at the socket of TBA client endpoint 627 of tester host 601, they are de-encapsulated and Ethernet frames are forwarded to the network tap device 625 that injects the Ethernet frames into TCP/IP stack 624. The test patterns are de-encapsulated from the Ethernet frames and their private destination IP address is translated by the destination NAT back to the real destination IP address originally associated with the test patterns by tester application 602. Tester application 622 then receives the test patterns via its socket API.

Tester applications 602 and 622 communicate via a virtual tester application protocol. This protocol is virtual in that from the point of view of the tester applications, they are communicating using real IP addresses, and are not aware that the communications pass through an emulated network DUT of a simulation acceleration system using private addressing.

Network tap 605 of FIG. 6 is a virtual kernel network device. In another embodiment, network tap 605 is replaced with a network tunnel. In this embodiment the TCP/IP stack 604 encapsulates the test patterns in IP datagrams that are transmitted by the network tunnel to TBA client endpoint 607 where they are encapsulated for transmission over packet tunnel 609. On the other side of the network DUT, another network tunnel (replacing network tap 625) receives IP datagrams that are de-encapsulated by TCP/IP stack 624.

FIG. 6 depicts an embodiment where a tester application and a TBA application reside on separate hosts. As appreciated by one of skill in the art, all, some, or none of the tester applications may reside on SA host 610. For example, in an alternative embodiment, tester application 602, socket API 603, kernal/TCP stack 604, tap 605, and TBA client endpoint reside on a SA host, while tester application 622, socket API 623, kernel/TCP stack 624, tap 625, and TBA client endpoint 627 reside on a tester host. In another alternative embodiment, both tester application 602 and 622 reside on the SA host.

Figure 7:
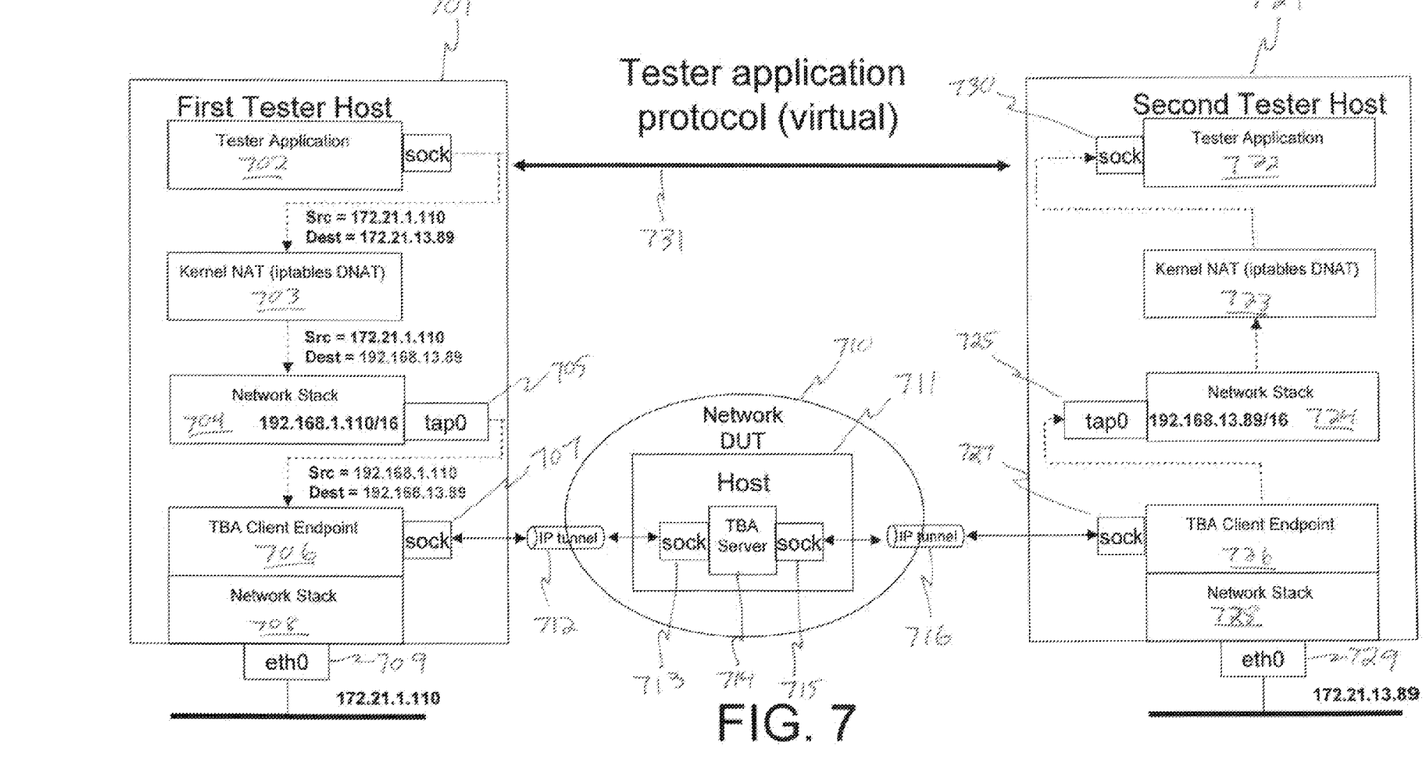
FIG. 7 is an illustration of the operation of two tester hosts running tester applications in communication with an emulator host.

FIG. 7 depicts an embodiment where the transfer of data from a tester application 702 in a first tester host 701 through a DUT 710 of a simulation acceleration (SA) host 711 to a destination tester application 722 in a second tester host 721. The first tester host 701 comprises tester application 702, kernel network address tables (NAT) 703, IP network stacks 704 and 708, a network tunnel device 705, a transaction-based acceleration (TBA) client endpoint 706, and various network interfaces. The second tester host 721 similarly comprises a tester application 722, kernel NAT 723, IP network stacks 724 and 728, a network tunnel device 725, a transaction-based client endpoint 726, and various network interfaces. SA host 711 comprises a network DUT modeled in a simulation acceleration/emulation system, a TBA server 714, and various network interfaces. To functionally verify the operation of the network DUT, tester application 702 generates test patterns bound for a network DUT 710 and uses standard IP addressing. The IP addresses used may be any standard IP address generally used by the tester application.

For illustration in this embodiment, the source tester host IP address is selected to be 172.21.1.110 and the destination tester host IP address is selected to be 172.21.13.89. Kernel NAT 703 receives test patterns generated by the tester application 702 via API socket 703 opened by the tester application. Kernel NAT 703 here is a destination NAT that operates on real destination IP address 172.21.13.89 associated with the test patterns to create a private destination IP address 192.168.13.89 for a network tunnel 725 of the destination tester host 721. The test patterns then passes to the IP stack 704, which has a network tunnel device 705 for IP addresses 192.168.1.110/16 attached to it. The network tunnel simulates an Ethernet device, creating a network bridge to the TBA client endpoint 706. TBA client endpoint 706 is an application that runs on the tester host 701 and routes transactions encapsulating the Ethernet frames to the SA host 711. TBA client endpoint application 706 also advertises a network identification/mask to the TBA server. The Ethernet frames are encapsulated into transactions for transmission from Ethernet port 709 having IP address 172.21.1.110.

On the SA host side of the IP tunnel, transactions are received at a socket 713 of TBA server 714, running a TBA server application. The TBA server 714 is responsible for establishing a socket-based IP tunnel for each of the one or more tester hosts, here, IP tunnel 712 for the source tester host 701 and IP tunnel 716 for the destination tester host 721. The TBA server receives transactions from the IP tunnel 712 at its socket 713, intercepting all of the Ethernet frames sent by source tester application 702. TBA server 714 further transmits transactions from its socket 715 to the destination tester host 721 using IP tunnel 716.

Destination tester host 721 is similar to the source tester host 701, comprising functionally equivalent hardware and software components. TBA client endpoint 726 advertises a network identification/mask to the TBA server, here including IP address 172.21.13.89 of Ethernet port 729. TBA client endpoint 726 has an established socket connection 727 to the SA host 711 via IP tunnel 716. Tester host 721 receives transactions encapsulating Ethernet frames from SA host 711 at Ethernet port 729. The Ethernet frames are de-encapsulated from the received transactions, after which TBA client endpoint 726 passes the Ethernet frames to the destination network tap 725 for IP addresses 192.168.13.89/16, which injects the Ethernet frame into IP network stack 724. Destination network tap 725 receives Ethernet frames having private source IP address 192.168.1.110 and private destination IP address 192.168.13.8. The Ethernet frames ascend through the TCP/IP network stack 724, passing to kernel NAT 723 the test patterns having associated source IP address 172.21.1.110 and destination IP address 192.168.13.89. Kernel NAT 723 operates on the private destination IP address 192.168.13.89 for tester application 722, associating real destination IP address 172.21.13.89 with the test patterns.

As a result, in this embodiment, tester application protocol 731 is unmodified for tester applications 702 and 722, and tester applications 702 and 722 generate test patterns as they would for a standard network device under test, i.e. a network DUT that was not modeled in a simulation acceleration/emulation system using TBA.

Source tester application 702 of the embodiment depicted in FIG. 7, directs the creation of Ethernet frames for interception by the network DUT. In another embodiment, source tester application 702 directs the creation of IP datagrams for interception by the network DUT. In this embodiment, network taps 705 and 724 are instead network tunnel devices.

Like the network taps, the network tunnel devices are virtual kernel network devices attached to TCP/IP stacks 704 and 725. However, the network tunnel devices simulate a real network device, transmitting and receiving IP datagrams rather than Ethernet frames.

Figure 8A:
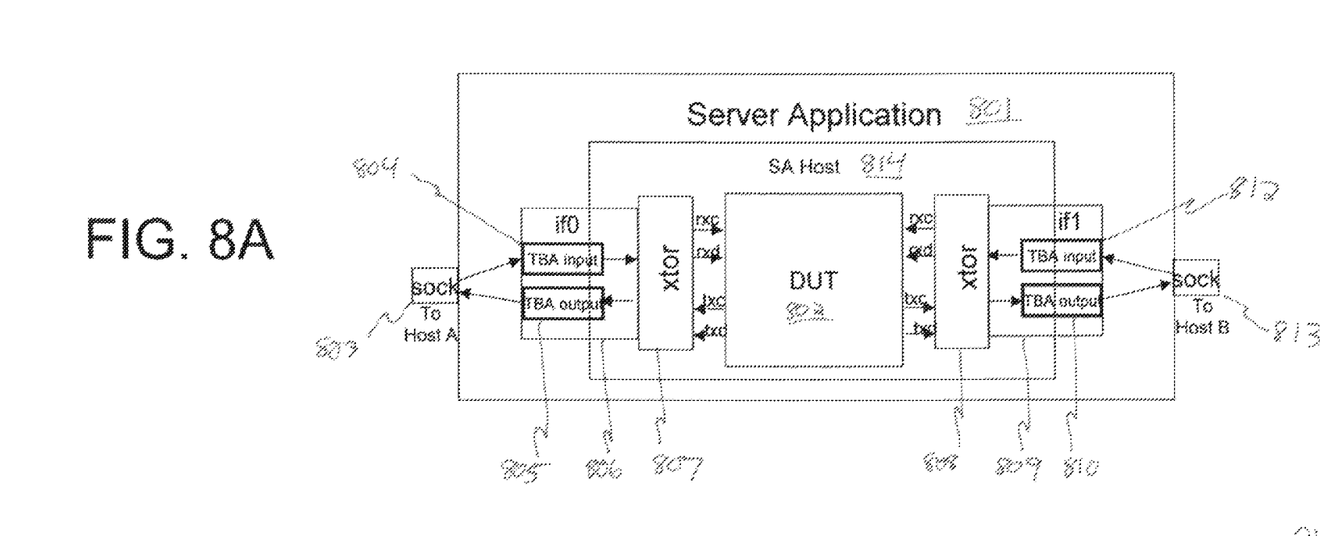
FIGS. 8A and 8B are illustrations of a configuration of a DUT hosted on an emulator host having two TBA interfaces to tester hosts.
Figure 8B:
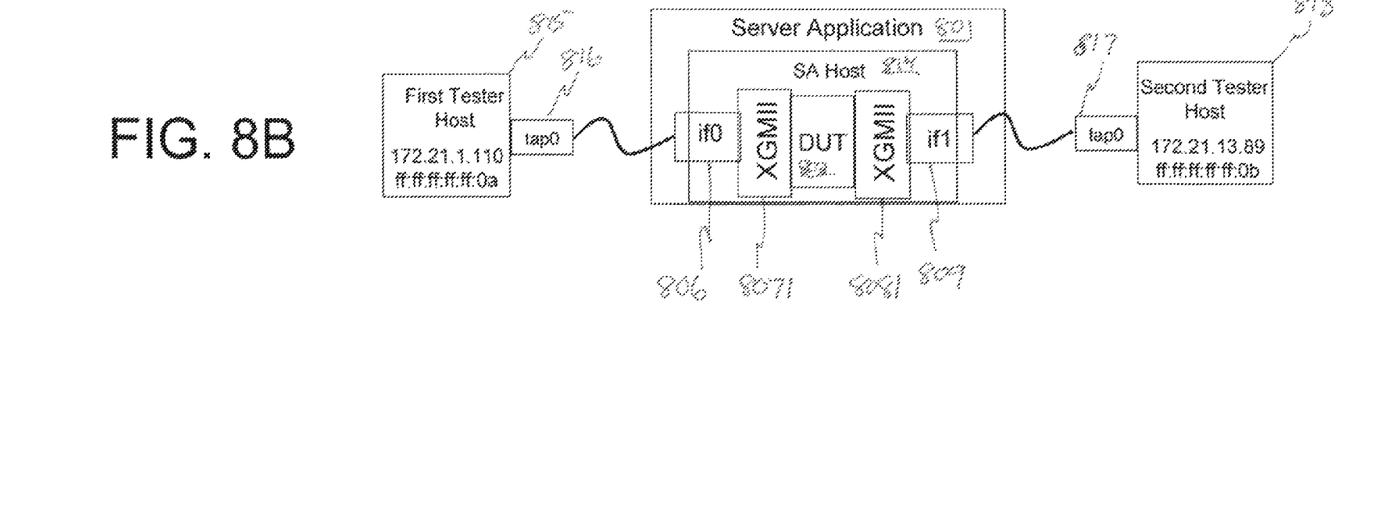

FIGS. 8A and 8B depict further detail of a server application 801 running on the simulation acceleration host 610 of an embodiment depicted in FIG. 6 or the simulation acceleration host 711 of an embodiment depicted in FIG. 7. DUT 802 is a two-port network device modeled in a simulation acceleration/emulation system. DUT 802 communicates through a standard TBA interface, for example 10 Gigabit Media Independent Interface (XGMII). XGMII is a variant of the Media Independent Interface (MII) standard and has two 32-bit wide data paths, one data path for transmission and one data path for reception, each data path operating at about 156.25 MHz. To communicate with a first tester host 815, DUT 802 interfaces with a hardware description language (HDL) side of transactor 807. A transactor specific to the interface used by DUT 802 is needed for proper communication. If XGMII is used as the interface, transactor 807 is an XGMII transactor 8071. On the C side of transactor 807, an interface 806 having port if0 contains a TBA output 805 and a TBA input 804. TBA output 805 sends transactions from transactor 807 to TBA client endpoint 607 or 706 of a tester host over a network tunnel having socket 803. TBA input 804 receives transactions from TBA client endpoint 607 or 706 over the network tunnel and forwards the transactions to transactor 807. A second interface if1 809 associated with a second transactor on the other side of DUT 802, containing TBA output 810 and TBA input 812, sends and receives transactions from a client endpoint of a second tester host 818 in much the same way as the first interface 806.

Interfaces 806 and 809 are configured with a port path, type, IP address, and media access control (MAC) address, as well as an address resolution protocol (ARP) cache of client MAC addresses. Connections between a TBA client application of the tester host and the TBA server application 801 of the simulation acceleration host are initiated by the TBA client application. The TBA client application advertises its IP address and its MAC address to the TBA server application, the MAC address either associated with a network tap device or a network tunnel device, depending on which device is attached the TCP/IP stack of the tester host. The TBA server application responds to the advertisement with an ARP acknowledge back to the tester host using the MAC address found in its configuration. Ethernet frames are then sent over the connection, the Ethernet frames mapping directly between the socket and the interface. The MAC address for Ethernet frames arriving out of the DUT interfaces are modified based on the ARP cache.

FIGS. 8A and 8B depict two XGMII interfaces because the depicted DUT 802 is a two-port network device. It is to be understood that the number of ports of the DUT determines the minimum number of XGMII interfaces required. For example, a DUT that is a thirty-two-port switch requires a minimum of thirty-two XGMII interfaces. FIG. 8A depicts one TBA input and one TBA output per XGMII interface. However, the number of TBA inputs and TBA outputs may be different from the number of XGMII interfaces.

Though certain embodiments are described above as comprising physical networks with distinct physical hosts, one of skill in the art will recognize that the elements of the above embodiments can also be implemented in a virtual network, using known "virtualization technology" to create such virtual networks. In these embodiments, all or some of the tester applications (or other applications) reside on the same physical host, for example the SA host. Then, a first tester application or other applications running on a first virtual host will appear to be at a separate and distinct network node from a second tester applications or other application running on a second virtual host, while in fact each application resides on the same physical host. Embodiments implemented in such virtual networks will be obvious to one of skill in the art from the above description.

Experimental results demonstrate some of the performance benefits of the present invention using particular hardware and software configurations. A first experimental setup included a basic Ethernet switch as a DUT emulated in a Cadence Design Systems, Inc. Palladium III system (Palladium), connected to a workstation running a tester application. The width of the workstation-Palladium interface was one-thousand two-hundred eighty bits, de-multiplexed to the internal bus width of the Ethernet switch DUT. The below chart demonstrates increased throughput over prior art systems:

| TBA Port Width | Internal Bus Width | Clocks Per Packet | Throughput |
| --- | --- | --- | --- |
| 1280 bits | 1280 bits | 1 | 220 Mbps |
| 1280 bits | 320 bits | 4 | 172 Mbps |
| 1280 bits | 128 bits | 10 | 110 Mbps |
| 1280 bits | 64 bits | 20 | 66 Mbps |
| 1280 bits | 32 bits | 40 | 43 Mbps |

XGMII, commonly used by those emulating DUTs in Palladium, has an internal bus width of thirty-two bits. As such, the last line of the above table represents exemplary experimental performance measured for the Ethernet switch DUT utilizing XGMII. The theoretical throughput for a single Palladium TBA channel is about five-hundred megabits per second. Performance can theoretically be scaled up to five-hundred megabits per second by increasing the internal bus width, although performance is also largely affected by the clock cycles and step counts required by the particular DUT.

In a second experimental setup, thirty-two simultaneous tester host IP streams were sent to an emulated Ethernet switch DUT having thirty-two ports in a Cadence Palladium III system. Each IP stream was represented by both a thirty-two-bit input word per clock cycle and a thirty-two-bit output word per clock cycle, modeling the thirty-two-bit XGMII interface corresponding to each of the thirty-two tester hosts. In this setup, throughput, here representing the total overall number of bits output through the DUT emulated in Palladium, was measured to be one-hundred fifteen megabits per second.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A method of functionally verifying a network device design, comprising:
   a) programming the network device design into a hardware logic verification system comprised of a plurality of hardware emulation resources;
   b) establishing a network tunnel between a client endpoint and a server application of the hardware logic verification system, wherein the network tunnel feeds a plurality of first data packets to a socket of the server application of the hardware logic verification system;
   c) de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet; and
   d) receiving the test patterns at the programmed network device.

2. The method of functionally verifying a network device design of claim 1, wherein the tester application runs on a tester host and the programmed network device resides on a host different from the tester host.

3. The method of functionally verifying a network device design of claim 1, wherein the first data packet comprises a transaction of a transaction based interface between the client endpoint and the hardware logic verification system.

4. The method of functionally verifying a network device design of claim 1, wherein the second data packet comprises an internet protocol datagram.

5. The method of functionally verifying a network device design of claim 1, wherein the second data packet comprises an Ethernet frame.

6. The method of functionally verifying a network device design of claim 1, wherein steps a) through d) are performed in seriatim.

7. A system for functionally verifying a network device design, comprising:
   a hardware logic verification system comprised of a plurality of hardware emulation resources and configured for performing a process, comprising:
   a) programming the network device design into the hardware logic verification system;
   b) establishing a network tunnel between a client endpoint and a server application of the hardware logic verification system, wherein the network tunnel feeds a plurality of first data packets to a socket of the server application of the hardware logic verification system;
   c) de-encapsulating a second data packet generated by a tester application from within a first data packet of the plurality of first data packets, wherein the second data packet comprises test patterns generated by the tester application and one or more second headers, and wherein the first data packet includes one or more first headers in addition to the second data packet; and
   d) receiving the test patterns at the programmed network device.

8. The system of claim 7, wherein the second data packet comprises a transaction of a transaction based interface between the client endpoint and the hardware logic verification system.

9. The system of claim 7, wherein the hardware logic verification system further comprises a tester host that runs the tester application, wherein the programmed network device resides on a host different from the tester host.

10. The system of claim 7, wherein the first data packet comprises an internet protocol datagram.

11. The system of claim 7, wherein the first data packet comprises an Ethernet frame.

12. The system of claim 7, wherein steps a) through d) are performed in seriatim.

13. A computer-readable non-transitory storage medium having stored thereon a plurality of instructions, the plurality of instructions when executed by a computer, cause the computer to perform:

a) programming a network device design into a hardware logic verification system comprised of a plurality of hardware emulation resources;
b) establishing a network tunnel between a client endpoint and a server application of the hardware logic verification system, wherein the network tunnel feeds a plurality of first data packets to a socket of the server application of the hardware logic verification system;
c) de-encapsulating a second data packet generated by the tester application from within a first data packet of the plurality of first data packets, wherein the second data packet comprises test patterns generated by the network tester application and one or more second headers, and wherein the first data packet includes one or more first headers in addition to the second data packet; and
d) receiving the test patterns at the programmed network device.

14. The computer-readable non-transitory storage medium of claim 13, wherein the tester application runs on a tester host and the programmed network device resides on a host different from the tester host.

15. The computer-readable non-transitory storage medium of claim 13, wherein the first data packet comprises a transaction of a transaction based interface between the client endpoint and the hardware logic verification system.

16. The computer-readable non-transitory storage medium of claim 13, wherein the first data packet comprises an internet protocol datagram.

17. The computer-readable non-transitory storage medium of claim 13, wherein the first data packet comprises an Ethernet frame.

18. The computer-readable non-transitory storage medium of claim 13, wherein steps a) through d) are performed in seriatim.

19. A computer-readable non-transitory storage medium having stored thereon a plurality of instructions, the plurality of instructions when executed by a computer, cause the computer to perform:

a) establishing a network tunnel between a client endpoint and a network device design programmed into a hardware logic verification system, wherein the hardware logic verification system is comprised of a plurality of hardware emulation resources;
b) generating a test pattern for a network device design by a tester application, wherein the tester application runs on a host having computing resources including at least a processor;
c) encapsulating the test pattern within a first data packet, wherein the first data packet includes one or more first headers in addition to the test pattern;
d) encapsulating the first data packet within a second data packet, wherein the second data packet includes one or more second headers in addition to the first data packet; and
e) transmitting the second data packet from the client endpoint to the network device design.

20. The computer-readable non-transitory storage medium of claim 19, wherein the tester application runs on a tester host and the programmed network device resides on a host different from the tester host.

21. The computer-readable non-transitory storage medium of claim 19, wherein the second data packet comprises a transaction of a transaction based interface between the client endpoint and the hardware logic verification system.

22. The computer-readable non-transitory storage medium of claim 19, wherein the first data packet comprises an internet protocol datagram.

23. The computer-readable non-transitory storage medium of claim 19, wherein the first data packet comprises an Ethernet frame.

24. The computer-readable non-transitory storage medium of claim 19, wherein steps a) through e) are performed in seriatim.

\* \* \* \* \*